United States Patent
Sugawara et al.

(10) Patent No.: US 9,362,860 B2
(45) Date of Patent: Jun. 7, 2016

(54) MULTI-PHASE MOTOR CONTROL APPARATUS AND ELECTRIC POWER STEERING APPARATUS USING THE SAME

(71) Applicant: NSK LTD., Shinagawa-ku, Tokyo (JP)

(72) Inventors: Takayoshi Sugawara, Shinagawa-ku (JP); Yousuke Imamura, Maebashi (JP); Hiroyasu Kumagai, Shinagawa-ku (JP)

(73) Assignee: NSK LTD, Tokyo (JP)

( * ) Notice: Subject to any disclaimer, the term of this patent is extended or adjusted under 35 U.S.C. 154(b) by 0 days.

(21) Appl. No.: 14/240,656

(22) PCT Filed: Oct. 11, 2013

(86) PCT No.: PCT/JP2013/077701
§ 371 (c)(1),
(2) Date: Feb. 24, 2014

(87) PCT Pub. No.: WO2014/171027
PCT Pub. Date: Oct. 23, 2014

(65) Prior Publication Data
US 2016/0072421 A1    Mar. 10, 2016

(30) Foreign Application Priority Data

Apr. 17, 2013 (JP) ................................. 2013-086906

(51) Int. Cl.
*H02P 6/00* (2006.01)
*H02P 21/00* (2016.01)
*H02P 23/14* (2006.01)

(52) U.S. Cl.
CPC ............ *H02P 21/0035* (2013.01); *H02P 6/002* (2013.01); *H02P 23/14* (2013.01)

(58) Field of Classification Search
CPC .... B62D 5/046; B62D 5/0481; B62D 5/0484; B62D 5/0487; B62D 5/049; B62D 5/0403; H02P 27/08; H02P 6/002; H02P 29/0038; H02P 21/0003; H02P 21/0035; H02P 21/0092; H02P 21/05; H02P 21/14

USPC .............. 318/400.02, 400.04, 432, 443, 446; 180/443; 701/42
See application file for complete search history.

(56) References Cited

U.S. PATENT DOCUMENTS 6,973,992 B2 * 12/2005 Yoneda ................... H02P 6/085
180/446
7,336,047 B2 * 2/2008 Ueda ...................... B62D 5/046
180/443

(Continued)

FOREIGN PATENT DOCUMENTS

JP         2-216362 A      8/1990
JP        2009-18808 A     1/2009

(Continued)

*Primary Examiner* — Paul Ip
(74) *Attorney, Agent, or Firm* — Sughrue Mion, PLLC

(57) ABSTRACT

A control device for a multiple motor comprises: a drive unit constituted by a pair of upper and lower arm switching elements for driving the multiphase motor; a single current detection circuit for detecting a current value; a PWM signal generation unit for generating a plurality of first phase PWM signals within two control cycles on the basis of the current value and a carrier signal; a phase shift control unit for shifting a first PWM signal with a prescribed phase generated by the PWM signal generation unit by gradually changing the amount of phase shift within the two control cycles, and outputting the shifted first PWM signal to the drive unit; and a current detection observer for estimating a current value for the multiphase motor on the basis of the current value. The PWM signal generation unit generates a plurality of second phase PWM signals within two control cycles on the basis of the estimated current value and carrier signal. When the phase shift amount in a prescribed phase in the control cycle immediately before the present control cycle is zero and the phase shift amount in a prescribed phase in the present control cycle is not zero, the phase shift control unit gradually increases the shift amount from zero in the present control cycle and the next control cycle to thereby use the second phase PWM signals in the next control cycle.

6 Claims, 8 Drawing Sheets

(56) References Cited

U.S. PATENT DOCUMENTS

| | | | | |
|---|---|---|---|---|
| 7,548,035 B2* | 6/2009 | Endo | ................ | B62D 5/046 318/400.02 |
| 7,952,310 B2* | 5/2011 | Hamasaki | ................ | H02P 6/14 318/400.01 |
| 8,080,957 B2* | 12/2011 | Miura | ................ | B62D 5/046 318/400.01 |
| 8,203,292 B2* | 6/2012 | Hamasaki | ................ | H02P 27/08 318/400.02 |
| 8,228,012 B2* | 7/2012 | Hamasaki | ................ | H02M 7/53875 318/400.02 |
| 8,339,089 B2* | 12/2012 | Suzuki | ................ | B62D 5/046 318/254.1 |
| 8,844,670 B2* | 9/2014 | Imamura | ................ | B62D 5/046 180/443 |
| 8,890,459 B2* | 11/2014 | Sakai | ................ | B62D 5/046 318/599 |
| 8,907,602 B2* | 12/2014 | Mukai | ................ | H02P 6/001 318/400.02 |
| 2004/0222035 A1* | 11/2004 | Yoneda | ................ | H02P 6/085 180/443 |
| 2007/0063663 A1* | 3/2007 | Ueda | ................ | H02P 6/002 318/432 |
| 2007/0090782 A1* | 4/2007 | Endo | ................ | B62D 5/046 318/432 |
| 2009/0134822 A1* | 5/2009 | Hamasaki | ................ | H02M 7/53875 318/400.04 |
| 2009/0134826 A1* | 5/2009 | Hamasaki | ................ | H02P 6/14 318/400.32 |
| 2009/0146590 A1* | 6/2009 | Hamasaki | ................ | H02P 27/08 318/400.02 |
| 2011/0221375 A1* | 9/2011 | Suzuki | ................ | B62D 5/046 318/496 |
| 2011/0264331 A1* | 10/2011 | Imamura | ................ | B62D 5/046 701/42 |
| 2012/0049782 A1* | 3/2012 | Suzuki | ................ | H02M 1/14 318/807 |
| 2012/0118662 A1* | 5/2012 | Sakai | ................ | B62D 5/046 180/443 |
| 2012/0145472 A1* | 6/2012 | Imamura | ................ | B62D 5/046 180/446 |
| 2012/0194109 A1* | 8/2012 | Uryu | ................ | B62D 5/046 318/400.15 |
| 2012/0211299 A1* | 8/2012 | Yanai | ................ | B62D 5/046 180/446 |
| 2013/0158808 A1* | 6/2013 | Imamura | ................ | B62D 5/046 701/42 |
| 2013/0271047 A1* | 10/2013 | Imamura | ................ | B62D 5/046 318/400.2 |
| 2014/0035491 A1* | 2/2014 | Mukai | ................ | H02P 6/001 318/400.02 |

FOREIGN PATENT DOCUMENTS

| | | |
|---|---|---|
| JP | 4884356 B2 | 2/2012 |
| JP | 2012-143101 A | 7/2012 |
| JP | 2012-218525 A | 11/2012 |
| JP | 2012-228155 A | 11/2012 |
| WO | 2012/093503 A1 | 7/2012 |

\* cited by examiner

PRIOR ART

PRIOR ART

PRIOR ART

MULTI-PHASE MOTOR CONTROL APPARATUS AND ELECTRIC POWER STEERING APPARATUS USING THE SAME

CROSS REFERENCE TO RELATED APPLICATIONS

This application is a National Stage of International Application No. PCT/JP2013/077701 filed Oct. 11, 2013, claiming priority based on Japanese Patent Application No. 2013-086906, filed Apr. 17, 2013, the contents of all of which are incorporated herein by reference in their entirety.

TECHNICAL FIELD

The present invention relates to a multi-phase motor control apparatus that calculates each-phase duty command values for controlling a current of a multi-phase motor by means of control calculation, forms PWM (Pulse Width Modulation) signals corresponding to each-phase duty command values, provides the multi-phase motor with command currents (voltages) from an inverter based on PWM control and drives the multi-phase motor, and concurrently relates to an electric power steering apparatus that provides a steering system of a vehicle with an assist torque generated by the multi-phase motor by using the multi-phase motor control apparatus. In particular, the present invention relates to a multi-phase motor control apparatus that reduces vibrations and noises (noisy sound) by gradually performing a shift correction over two control periods with respect to each-phase PWM-signals, during the shift correction, estimating a current by means of a current detection observer and continuing current detection, and stably performing the current detection (A/D conversion) at a current detection timing that a PWM-signal of one phase becomes ON state or PWM-signals of two phases simultaneously become ON state and processing along with arranging a single type current detection circuit (a one-shunt type current detection circuit) at a power-supply input side or a power-supply output side (ground side) of the inverter and performing the PWM control, and to an electric power steering apparatus using the above multi-phase motor control apparatus.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the steering assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of duty command values of a PWM control.

A general configuration of a conventional electric power steering apparatus will be described with reference to FIG. 1. As shown in FIG. 1, a column shaft (a steering shaft, a handle shaft) 2 connected to a steering wheel (a steering handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting a steering torque of the steering wheel 1, and a motor 20 for assisting the steering force of the steering wheel 1 is connected to the column shaft 2 through the reduction gears 3. Electric power is supplied to a control unit (ECU) 100 for controlling the electric power steering apparatus from a battery 13, and an ignition key signal is inputted into the control unit 100 through an ignition key 11. The control unit 100 calculates a current command value of an assist (steering assist) command based on a steering torque Tr detected by the torque sensor 10 and a vehicle velocity Vel detected by a vehicle velocity sensor 12, and controls a current supplied to the motor 20 based on a voltage control value E obtained by performing compensation and so on with respect to the current command value. Moreover, it is also possible to receive the vehicle velocity Vel from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque Tr detected by the torque sensor 10 and the vehicle velocity Vel from the vehicle velocity sensor 12 are inputted into a current command value calculating section 101, and a current command value Iref1 is calculated by means of an assist map and so on. The calculated current command value Iref1 is inputted into a maximum output limiting section 102 and an output is limited based on an overheat protection condition or the like in the maximum output limiting section 102. A current command value Iref2 that a maximum output is limited, is inputted into a subtracting section 103.

The subtraction section 103 calculates a deviation Iref3 (=Iref2−Im) between the current command value Iref2 and a motor current Im of the motor 20 that is fed back, the deviation Iref3 is controlled by a current control section 104 such as a PI control (proportional and integral control) or the like, the controlled voltage control value E is inputted into a PWM control section 105 and the duty command value is calculated, and in accordance with a PWM-signal PS that the duty command value is calculated, the motor 20 is driven through an inverter 106. The motor current Im of the motor 20 is detected by a current detection circuit 120 within the inverter 106, and the detected motor current Im is inputted into the subtracting section 103 to feed back. In the case of vector-controlling the motor 20 by dq-axes, a resolver 21 as a rotation sensor is connected to the motor 20, and an angular speed calculating section 22 for calculating an angular speed ω from a rotation angle θ is provided.

A bridge circuit that bridge-connects semiconductor switching elements (FETs) and the motor 20 is used in the inverter 106 that controls the motor current Im by means of the voltage control value E and drives the motor 20, and the motor current Im is controlled by performing ON/OFF control of the semiconductor switching elements in accordance with the duty command value of the PWM-signal determined based on the voltage control value E.

In the case that the motor 20 is a three-phase (U-phase, V-phase and W-phase) brushless DC motor, details of the PWM control section 105 and the inverter 106 become a configuration such as shown in FIG. 3. That is, the PWM control section 105 comprises a duty calculating section 105A that inputs each-phase carrier signals and calculates PWM-duty command values D1~D6 of three phases (U-phase, V-phase and W-phase) in accordance with a predetermined expression based on the voltage control value E, and a gate driving section 105B that drives each gate of FET1~FET6 by the PWM-duty command values D1~D6 to turn ON/OFF. The inverter 106 comprises a three-phase bridge having upper/lower arms comprised of a U-phase upper-stage FET1 and a U-phase lower-stage FET4, upper/lower arms comprised of a V-phase upper-stage FET2 and a V-phase lower-stage FET5, and upper/lower arms comprised of a W-phase upper-stage FET3 and a W-phase lower-stage FET6, and drives the motor 20 by being turned ON/OFF with the PWM-duty command values D1~D6. Further, electric power is supplied to the inverter 106 from the battery 13 through a power-source relay 14. The PWM-signal that determines ON/OFF timing of the switching elements for driving the multi-phase motor, is generated by comparing the carrier signal of a saw-tooth waveform or triangular waveform with the duty command value corresponding to a target current value in each phase of the multi-phase motor. Depending on the value of the carrier signal is equal to or more than the duty command value or the value of the carrier signal is less than the duty command value, the PWM-signal is determined as a high level (H) or a low level (L).

In such a configuration, although it is necessary to measure a drive current of the inverter 106 or the motor current of the motor 20, as one of request items of downsizing, weight saving and cost-cutting of the control unit 100, it is singularity of the current detection circuit 120. A one-shunt type current detection circuit is known as the singularity of a current detection circuit, and for example, the configuration of the one-shunt type current detection circuit 120 is shown in FIG. 4 (for example, Japanese Published Unexamined Patent Application No. 2009-131064 A). That is to say, a shunt resistor R1 is connected between the lower-stage arm of the FET bridge and ground (GND), a fall voltage that is caused by the shunt resistor R1 when a current flowed in the FET bridge is converted into a current value Ima by an operational amplifier (a differential amplification circuit) 121 and resistors R2~R4, and further the current value Ima is A/D-converted at a predetermined timing by an A/D converting section 122 through a filter comprised of a resistor R6 and a capacitor C1, and then a current value Im that is a digital value is outputted. Moreover, a voltage "2.5V" being a reference voltage is connected to a positive input terminal of the operational amplifier 121 through a resistor R5.

FIG. 5 shows a wiring diagram of the battery 13, the inverter 106, the current detection circuit 120 and the motor 20 and also shows current routes (indicated by dashed lines) during a state that the U-phase upper-stage FET1 is turned ON (the U-phase lower-stage FET4 is turned OFF), the V-phase upper-stage FET2 is turned OFF (the V-phase lower-stage FET5 is turned ON), and the W-phase upper-stage FET3 is turned OFF (the W-phase lower-stage FET6 is turned ON). Further, FIG. 6 shows current routes (indicated by dashed lines) during a state that the U-phase upper-stage FET1 is turned ON (the U-phase lower-stage FET4 is turned OFF), the V-phase upper-stage FET2 is turned ON (the V-phase lower-stage FET5 is turned OFF), and the W-phase upper-stage FET3 is turned OFF (the W-phase lower-stage FET6 is turned ON). It is clear from these current routes of FIG. 5 and FIG. 6 that a total value of phases that the upper-stage FETs are turned ON, appears in the current detection circuit 120 as a detected current. That is, it is possible to detect a U-phase current in FIG. 5, and it is possible to detect the U-phase current and a V-phase current in FIG. 6. This is the same as in the case that the current detection circuit 120 is connected between the upper-stage arm of the inverter 106 and the power source (the battery 13). Moreover, in FIG. 5 and FIG. 6, the connection of the resolver 21 and the power-source relay 14 are omitted.

As a result, the current detection circuit 120 detects the current during a state that one phase is turned ON and during a state that two phases are turned ON, and by utilizing a characteristic that the sum of currents of three phases is "0", it is possible to detect each-phase currents of three phases. Although a current $I_U$ of the U-phase is detected in the case of FIG. 5 and a total value of the current $I_U$ of the U-phase and a current $I_V$ of the V-phase is detected in the case of FIG. 6, since there is a relation of "$I_U+I_V+I_W=0$" in the case of three phases, it is possible to detect the current $I_W$ of the W-phase as "$I_W=-(I_U+I_V)$".

However, in the inverter 106 that is configured by a single type current detection circuit 120 shown in FIG. 4, it is necessary to remove the influence of noise components such as rigging noises that occur due to a current flowing in the current detection circuit 120 just after each FET is turned ON and to detect an accurate current. Further, in the case that the interval of timing to turn the FET ON/OFF becomes very short between one phase and another phases, due to a matter that a necessary current for current detection does not flow in the FET, the existence of a dead time (a dead zone) and further a response delay of the circuit or the like, it becomes impossible to perform an accurate current measurement. In the case that the A/D converting section is used in the current detection circuit, the signal with the same magnitude has to be successively inputted for a fixed period (for example, 2 μs or more) so that the A/D conversion operation is carried out normally. This is because it is impossible for the A/D converting section to detect an accurate current value when a stable signal is not successively inputted.

Therefore, it is necessary to continue the state that one phase is turned ON and the state that two phases are turned ON only for a necessary time for the current detection. However, in the case that each-phase duty command values approximate each other, there is a problem that it is impossible to secure the necessary time for the current detection.

In the case that the time interval during switching of one phase and another phases is small, for example, by performing a correction to shift (arrangement-move) the phase of a predetermined phase, the time interval during switching of one phase and another phases becomes large, and it becomes possible to detect accurate current values of all phases of the multi-phase motor by means of a single type current detection circuit. However, as a result of performing the shift correction, when ON/OFF frequencies of the switching elements for driving the multi-phase motor are included within audio-frequency range, users hear the ON/OFF frequencies as noises (noisy sound) and the ON/OFF frequencies give an uncomfortable feeling to the users.

FIG. 7 shows a timing chart in the case that two phases are not detectable with respect to U-phase, V-phase and W-phase of three phases, one control period is 250 μs and includes five control periods of the PWM-signal of saw-tooth waveform of 50 μs period. FIG. 7 shows operations in the fourth and the fifth periods of the previous control period T1, and the first to the fifth periods of the present control period T2. The previous control period T1 shows a case that U-phase PWM-signal is duty 52%, V-phase PWM-signal is duty 47% and W-phase PWM-signal is duty 51%. Since a time interval between the V-phase being a duty minimum phase and the W-phase being a duty intermediate phase and a time interval between the W-phase being the duty intermediate phase and the U-phase being a duty maximum phase are 4% and 1% respectively, that is, since these two time intervals are short, if a phase shift is not performed, switching noises during the term do not go down, and an A/D conversion time for accurately detecting the current value cannot be secured. Therefore, the phase of the PWM-signal of the V-phase being the duty minimum phase is shifted to the left side (to advance phase) by 8%, and the phase of the PWM-signal of the U-phase being the duty maximum phase is shifted to the right side (to delay phase) by 11%. In this way, both the switching time interval between the V-phase and the W-phase and the switching time interval between the U-phase and the W-phase become large to 12%, and it is possible to detect accurate current values of the U-phase and the V-phase in each PWM-period.

The operations in the first to the fifth periods of the present control period T2 will be described. In the present control period T2, the U-phase PWM-signal decreases from duty 52% to duty 51%, the V-phase PWM-signal is duty 47% and there is no change in duty, and the W-phase PWM-signal increases from duty 51% to duty 52%. Therefore, the duty maximum phase changes from the U-phase to the W-phase, and the duty intermediate phase changes from the W-phase to the U-phase. Moreover, the duty minimum phase is the V-phase this time too. Since a time interval between the V-phase being the duty minimum phase and the U-phase being the duty intermediate phase and a time interval between the U-phase being the duty intermediate phase and the W-phase being the duty maximum phase are 4% and 1% respectively, that is, since these two time intervals are short, if the phase shift is not performed, switching noises during the period do not go down, and then A/D conversion time for accurately detecting the current value cannot be secured. Therefore, the phase of the PWM-signal of the V-phase being the duty minimum phase is shifted to the left side (to advance phase) by 8%, the phase of the PWM-signal of the W-phase being the duty maximum phase is shifted to the right side (to delay phase) by 11%, and the PWM-signal of the U-phase being the duty intermediate phase is not shifted.

In this way, in each of the five PWM-periods of the present control period T2, both the switching time interval between the U-phase and the V-phase and the switching time interval between the W-phase and the U-phase become large to 12%, and it is possible to detect accurate current values of the U-phase and the V-phase in each PWM-period.

Moreover, this example is a case that the U-phase changes from "shift" to "no shift", the V-phase remains in "shift" and does not change in shift amount, and the W-phase changes from "no shift" to "shift". Like this, when "shift"/"no shift" changes due to a change in the magnitude relation of each-phase duty ratios in the previous control period T1 and the present control period T2, at an ending time of the previous control period T1, i.e. at a starting time of the present control period T2, an instantaneous current fluctuation occurs as shown in a shunt waveform (a waveform of a voltage generated between both ends of a shunt resistor for current detection). In accordance with this drastic current fluctuation, there is a problem that noises from the motor that are based on a current ripple occur. Moreover, the shunt waveform of FIG. 7 shows the currents of the U-phase and −(the V-phase) in the previous control period T1 and also shows the currents of the W-phase and −(the V-phase) in the present control period T2.

As described above, in some cases, noises occur due to the influence of the current ripple associated with the drastic current fluctuation caused by a change in a shift state in respective control periods T1 and T2. The change in the shift state includes the following three cases.
    (1) a change from "no shift" to "shift"
    (2) a change from "shift" to "no shift"
    (3) a change from "shift (shift amount A)" to "shift (shift amount B)" having a change of the shift amount (i.e. A≠B)

As an apparatus or a method that solves such a problem, there is a multi-phase motor control apparatus disclosed in the publication of Japanese Patent No. 4884356 B2 (Patent Document 1). The multi-phase motor control apparatus of Patent Document 1 comprises a driving section comprising pairs of upper-stage arm switching elements and lower-stage arm switching element, and driving the multi-phase motor; a single type current detection circuit detecting current values of the multi-phase motor; a PWM-signal generating section generating plural each-phase PWM-signals within one control period based on the current value detected by the current detection circuit and a carrier signal; and a phase movement section moving the PWM-signal of a predetermined phase generated by the PWM-signal generating section by gradually changing a movement amount of the phase within one control period and outputting the PWM-signal which is moved to the driving section. Then, the phase movement section gradually increases a shift amount from zero in a control period of the present time in a case that a movement amount of the phase of the predetermined phase in a control period just before is zero and a movement amount of the phase of the predetermined phase in the control period of the present time is not zero. Further, the phase movement section gradually decreases the shift amount to zero in the control period of the present time in a case that the movement amount of the phase of the predetermined phase in the control period just before is not zero and the movement amount of the phase of the predetermined phase in the control period of the present time is not zero.

THE LIST OF PRIOR ART DOCUMENTS

Patent Documents

Patent Document 1: Japanese Patent No. 4884356 B2

SUMMARY OF THE INVENTION

Problems to be Solved by the Invention

However, since the shift correction is limited within one control period in the apparatus disclosed in Patent Document 1, accordingly, the shift amount for every PWM-period becomes large. Further, since the apparatus disclosed in Patent Document 1 completes the shift correction within one control period (since the shift correction is limited within one control period, it is impossible to perform the shift correction by using five PWM-periods or more), there is a problem that suppressing the occurrence of the vibrations and the noises (noisy sound) small is also limited.

The present invention has been developed in view of the above-described circumstances, and an object of the present invention is to provide a multi-phase motor control apparatus that reduces the occurrence of the vibrations and the noises (noisy sound) by setting the shift amount per time more finely after realizing a reduction in processing ability of a CPU by using a one-shunt type current detection circuit and an electric power steering apparatus using the same.

Means for Solving the Problems

The present invention relates to a multi-phase motor control apparatus, the above-described object of the present invention is achieved by that comprising: a driving section comprising pairs of upper-stage arm switching elements and lower-stage arm switching elements, and driving a multi-phase motor; a single type current detection circuit detecting current values of said multi-phase motor; a PWM-signal generating section generating plural first each-phase PWM-signals within two control periods based on said current values detected by said current detecting circuit and a carrier signal; a phase shift control section shifting a first PWM-signal of a predetermined phase, which is generated in said PWM-signal generating section, by gradually changing a phase shift amount within two control periods, and outputting said shifted first PWM-signal to said driving section; and a current detection observer estimating a current estimation value of said multi-phase motor based on said current values detected by said current detection circuit; wherein said PWM-signal generating section generates plural second each-phase PWM-signals within two control periods based on said current estimation value and said carrier signal; and wherein in a case that a phase shift amount of a predetermined phase in a just before control period is zero and a phase shift amount of a predetermined phase in a present control period is not zero, said phase shift control section gradually increases said phase shift amount from zero in said present control period and a next control period, and uses said second each-phase PWM-signals in said next control period; or wherein in a case that a phase shift amount of a predetermined phase in a just before control period is not zero and a phase shift amount of a predetermined phase in a present control period is zero, said phase shift control section gradually decreases said phase shift amount to zero in said present control period and a next control period, and uses said second each-phase PWM-signals in said next control period.

Further, the above-described object of the present invention is more effectively achieved by that wherein said phase shift control section calculates a phase shift amount to a final shift position of said first PWM-signal, and shifts by "phase shift amount/n" as a shift number is n times; or wherein with respect to said phase shift of said determined phase, shift times m (<n) are performed in said present control period and rest (n–m) times are performed in said next control period; or wherein said current detection observer estimates a current value in said present control period based on a current value detected in a previous control period.

It is possible to achieve the electric power steering apparatus of the above-described object by mounting each of the above-described multi-phase motor control apparatuses.

Effects of the Invention

Since the present invention detects the current of the multi-phase motor by using a one-shunt type current detection circuit and gradually shifts the predetermined duty phase over two control periods of the PWM control period, it is possible to suppress a current change amount small, and it is possible to further reduce the vibrations and the noises. Although it is impossible to detect the current at the first period within two periods of the PWM control, since the present invention estimates the current value by using a current detection observer and sets the duty ratio based on a current estimation value, it is possible to continuously perform the current control.

BRIEF DESCRIPTION OF THE DRAWINGS

In the accompanying drawings.

MODE FOR CARRYING OUT THE INVENTION

In order to detect each-phase motor currents by using a one-shunt type current detection circuit, generally, each-phase motor currents are detected by forming a state that keeps a PWM-ON state of an intended phase for a predetermined period of time depending on arrangement-moving (shift) of each-phase PWM-signals and performing the current detection. In this case, although the duty arrangement within one PWM-control period is determined by the magnitudes of each-phase duty command values, in the case that the state of the magnitudes of certain two phases changes and two phases are rearranged, when rearranging two phases simultaneously, the motor working sound occurs due to the occurrence of the drastic current change. The present invention further reduces the vibrations and the noises (noisy sound) by gradually changing a predetermined phase over two periods of the PWM-control period and suppressing the current change amount as small as possible.

That is to say, the present invention is a multi-phase motor control apparatus that calculates each phase duty command values for controlling a current of a multi-phase motor (for example, a three-phase (U-phase, V-phase and W-phase) brushless DC motor) by means of control calculation, forms PWM-signals corresponding to each-phase duty command values, provides the multi-phase motor with command currents (voltages) from an inverter based on PWM control and drives the multi-phase motor. Further, the present invention is an electric power steering apparatus using the above-described multi-phase motor control apparatus. The present invention provides a single type current detection circuit (a one-shunt type current detection circuit) at a power-source input side or a power-source output side (ground side) of the inverter and performs the PWM control. Then, in order to finely get the shift amount per time, the present invention gradually performs a shift correction over two control periods with respect to each-phase PWM-signals. Since it is impossible to perform the current detection during the shift correction, the present invention continues the current detection by estimating the current by means of a current detection observer, and stably performs the current detection (A/D conversion) at a current detection timing that the PWM-signal of one phase becomes ON state or the PWM-signals of two phases simultaneously become ON state and processes. Accordingly, the present invention can reduce vibrations and noises with the above constitution and the operation. In particular, since the present invention performs the shift correction over two control periods while continuing the current control by using the current detection observer, it is possible to perform a fine correction, and it is possible to further reduce the vibrations and the noises.

Hereinafter, an embodiment of the present invention will be described with reference to the accompanying drawings.

Figure 1:
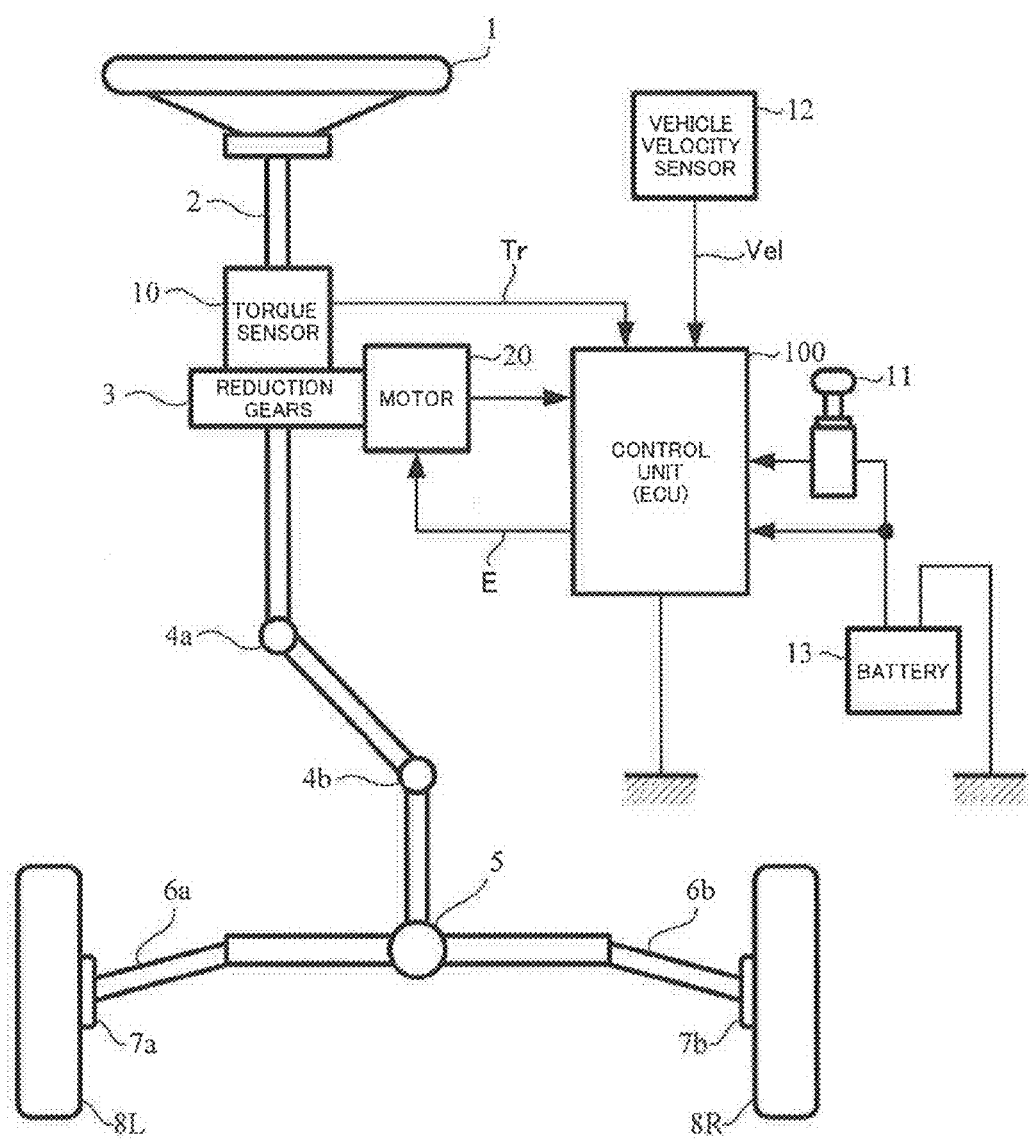
FIG. 1 is a configuration diagram illustrating a general outline of an electric power steering apparatus.
Figure 2:
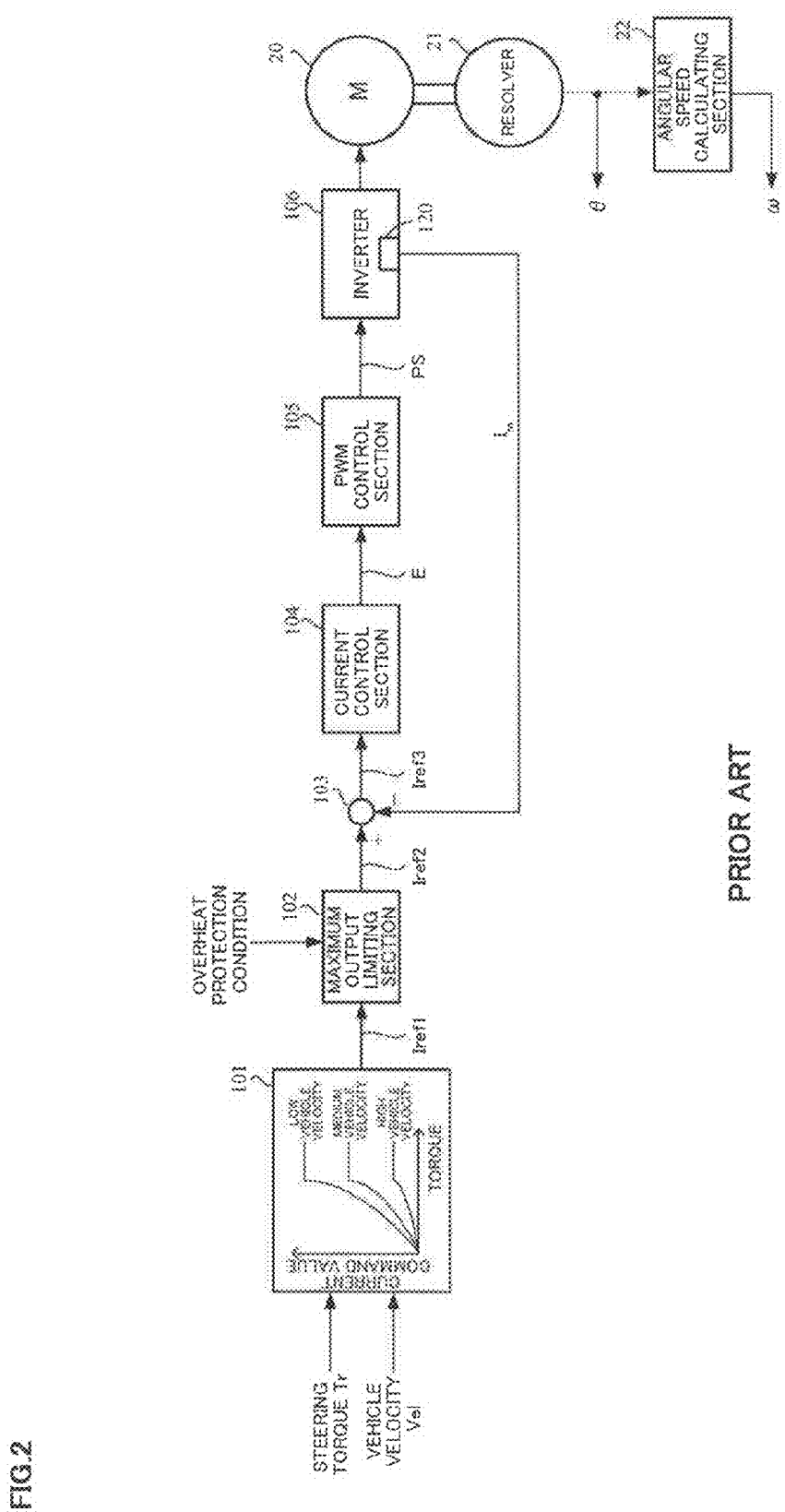
FIG. 2 is a block diagram showing a general configuration example of a control unit.
Figure 3:
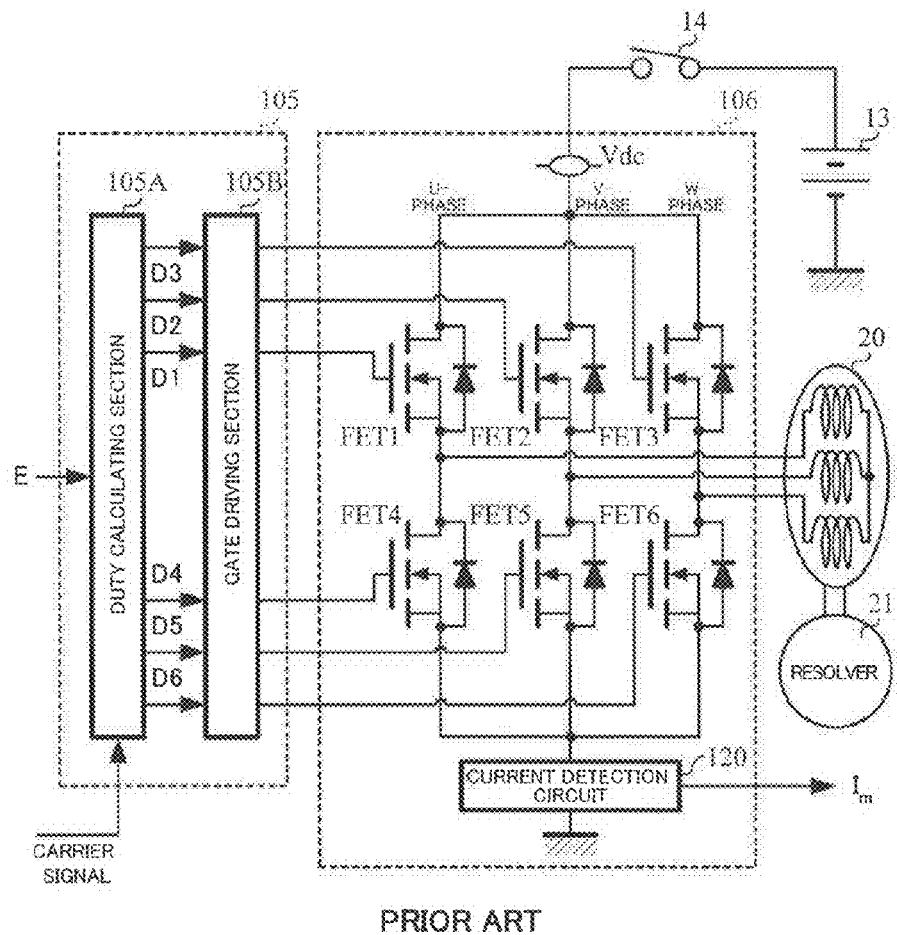
FIG. 3 is a wiring diagram showing a configuration example of a PWM control section and an inverter.
Figure 4:
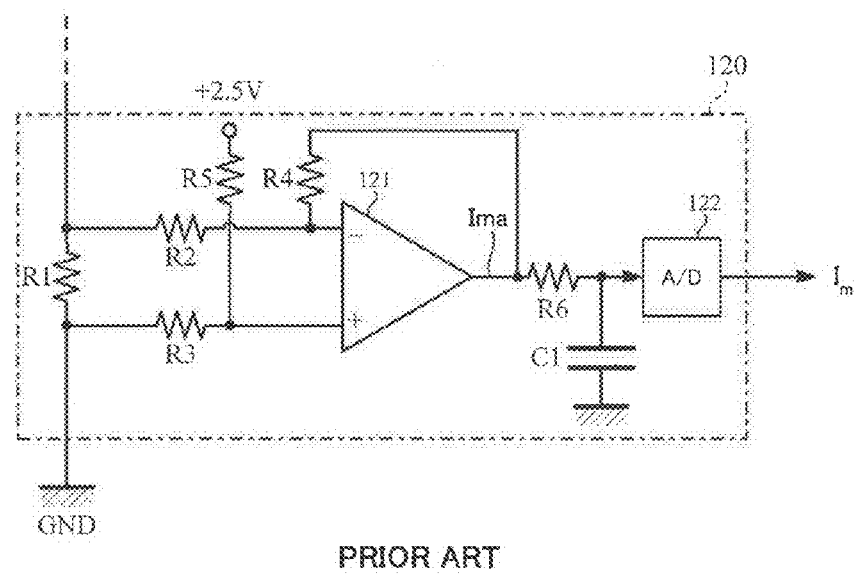
FIG. 4 is a wiring diagram showing a configuration example of a one-shunt type current detection circuit.
Figure 5:
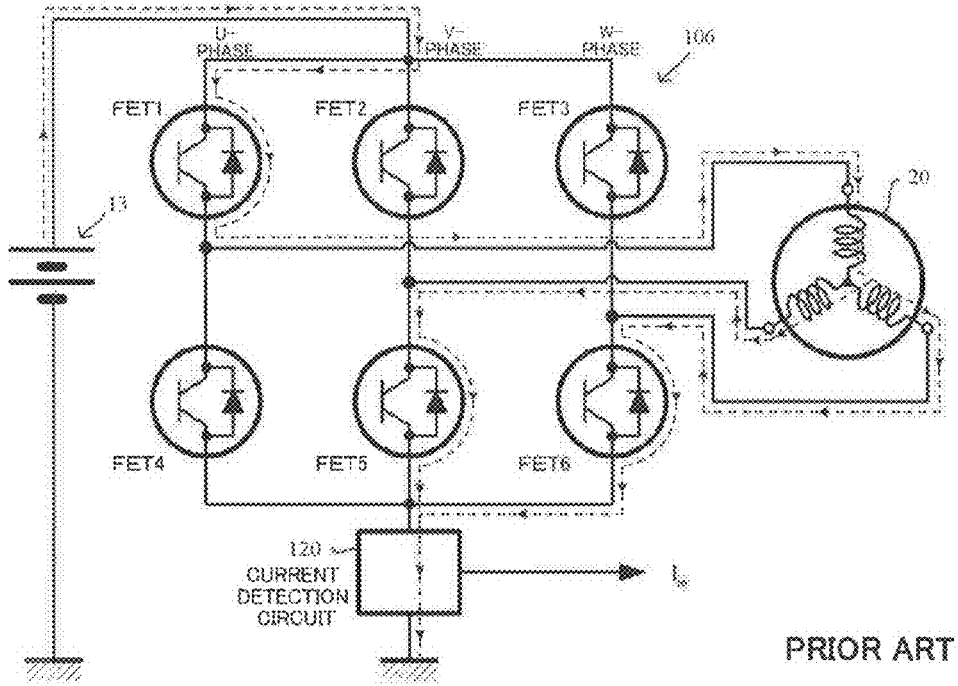
FIG. 5 is a current route diagram showing one current detection operation example of the inverter equipped with the one-shunt type current detection circuit.
Figure 6:
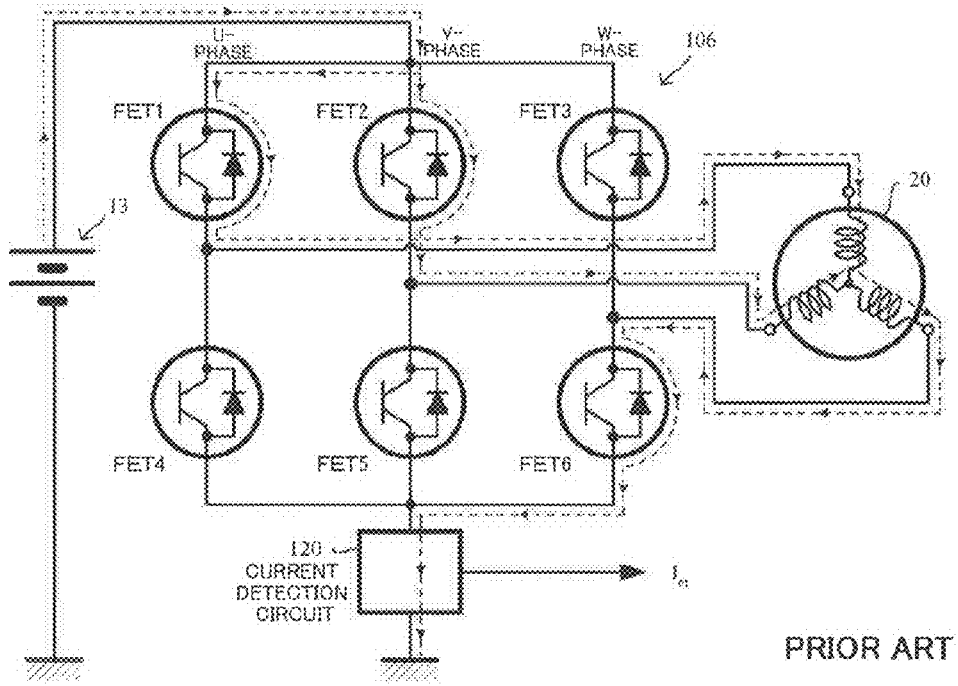
FIG. 6 is a current route diagram showing another current detection operation example of the inverter equipped with the one-shunt type current detection circuit.
Figure 7:
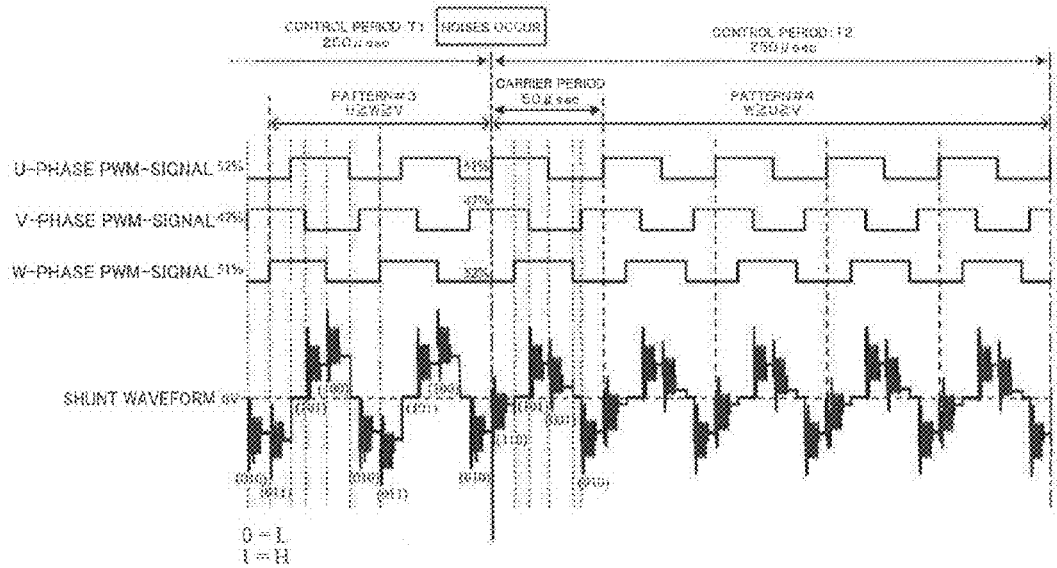
FIG. 7 is a timing chart in the case that two phases are not detectable with respect to each-phase PWM-signals.
Figure 8:
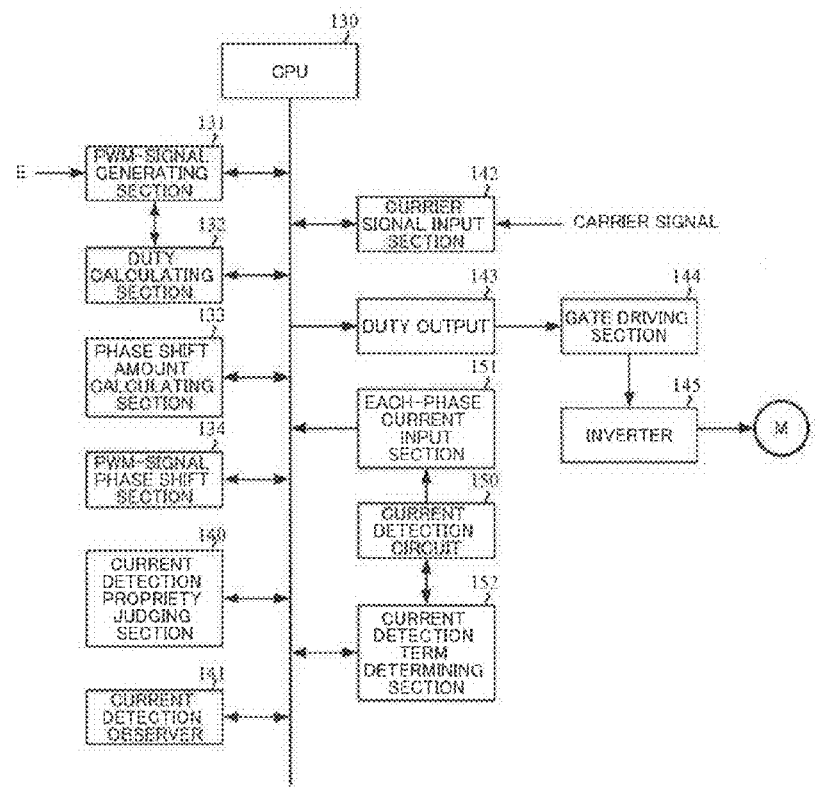
FIG. 8 is a block diagram showing a configuration example of the present invention.

FIG. 8 shows one example of the embodiment of the present invention. As shown in FIG. 8, a PWM-signal generating section 131 that generates each-phase PWM-signals based on a current control value E is connected to a CPU 130 for performing entire control via a duty calculating section 132, and a current detection propriety judging section 140 that judges whether a current detection by means of a one-shunt type current detection circuit 150 is possible or not is connected to the CPU 130. The current detection propriety judging section 140 judges whether it is possible to detect the current value by means of the current detection circuit 150 or not, that is, whether there is a switching time interval only being capable of detecting the accurate current value by means of the current detection circuit 150 or not based on each-phase PWM-signals generated by the PWM-signal generating section 131. A phase shift amount calculating section 133 calculates the phase shift amount of the PWM-signal in the case of judging that it is impossible to detect the accurate current value by means of the current detection circuit 150, a PWM-signal phase shift section 134 advances or delays the phase of the PWM-signal based on the calculated phase shift amount by gradually changing over seven times within two control periods, and the phase-shifted PWM-signal is outputted via a duty output section 143 and through a gate driving section 144 and an inverter 145 to drive the motor. The phase shift amount calculating section 133 and the PWM-signal phase shift section 134 configure a phase shift control section.

A current detection term determining section 152 determines a current detection start timing and a current detection term depending on the current detection circuit 150, based on the falling time of each-phase PWM-signals determined by the phase shift amount calculating section 133. An each-phase current input section 151 calculates the current value of the remaining phase that it is impossible to directly detect, based on the current value detected by the current detection circuit 150 and the PWM-signals generated by the PWM-signal generating section 131 and inputs.

Further, a current detection observer 141 shown in for example Japanese Published Unexamined Patent Application No. 2002-252991 A is connected to the CPU 130 and estimates the current value in the present control period by means of a publicly known method based on the current value detected by the current detection circuit 150 in the previous control period. The carrier signal of a triangular waveform or saw-tooth waveform is inputted via a carrier signal input section 142. Moreover, a memory that stores the current detection value and so on is connected separately.

Figure 9:
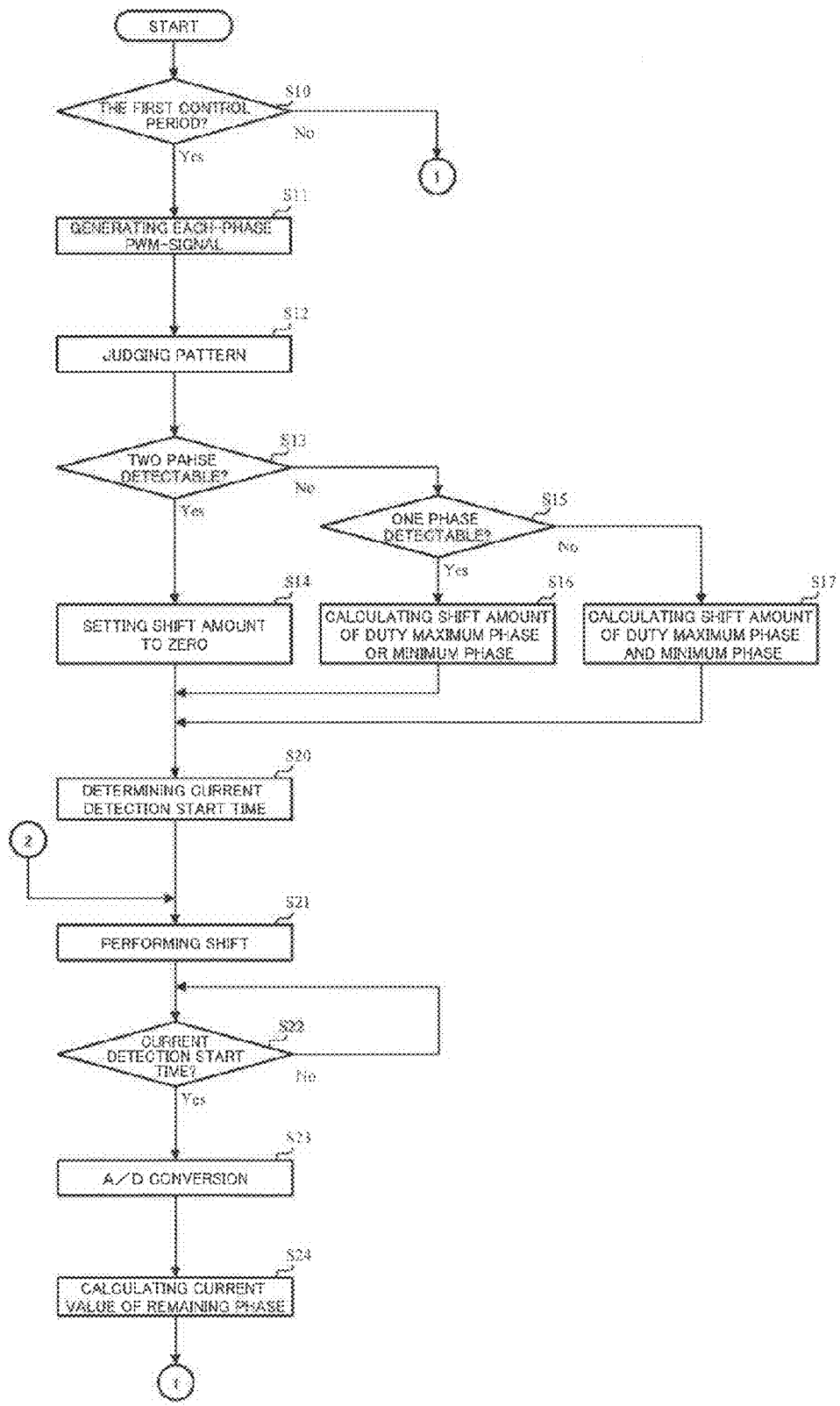
FIG. 9 is apart of a flowchart showing an operation example of the present invention.
Figure 10:
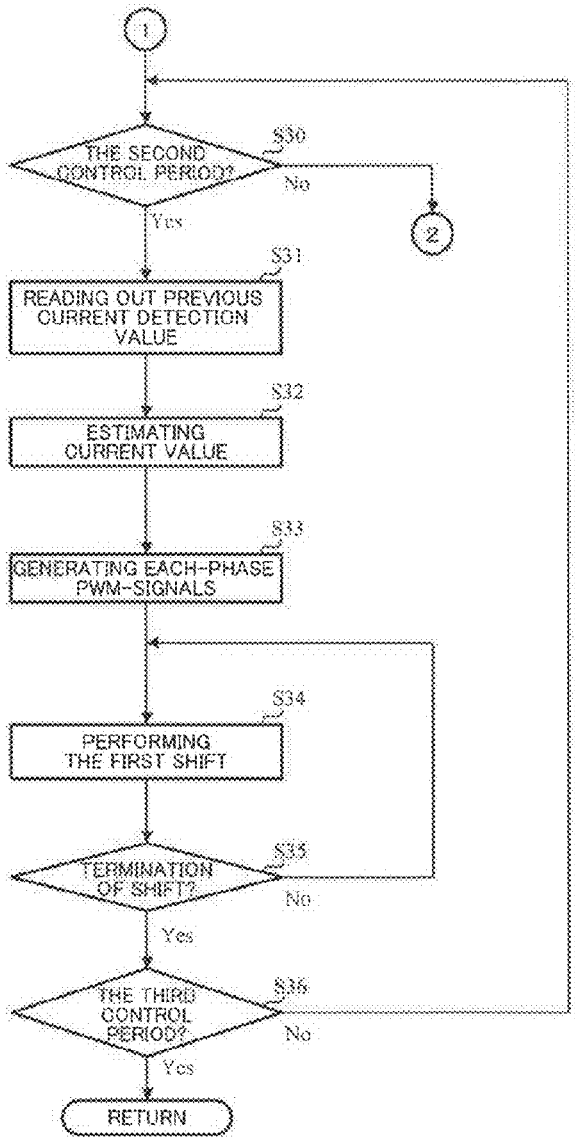
FIG. 10 is a part of the flowchart showing the operation example of the present invention.

FIG. 9 and FIG. 10 are flowcharts showing an operation example of the multi-phase motor control apparatus according to the embodiment of the present invention.

At first, it is judged whether it is the first control period or not (Step S10), in the case of the first control period, the PWM-signal generating section 131 generates PWM-signals of the U-phase, the V-phase and the W-phase based on the steering torque, the vehicle velocity, the duty command values calculated by the duty calculating section 132 and so on (Step S11). Next, a pattern judgment shown in for example Patent Document 1 is performed based on the duty command values of the U-phase, the V-phase and the W-phase (Step S12), and the current detection propriety judging section 140 firstly judges whether it is possible to detect currents of two phases or not (Step S13). In a case that it is possible to detect the currents of two phases, since it is not necessary to perform the shift correction, the phase shift amount calculating section 133 sets the shift amount to zero (Step S14). Further, the current detection propriety judging section 140 judges whether it is possible to detect a current of one phase or not in the case that it is impossible to detect the currents of two phases (Step S15), in the case that it is possible to detect the current of one phase, the phase shift amount calculating section 133 calculates the shift amount of a duty command value maximum phase or a duty command value minimum phase (Step S16). In the case that it is impossible to detect the current of one phase, the phase shift amount calculating section 133 calculates the shift amounts of the duty command value maximum phase and the duty command value minimum phase (Step S17). Although the phase shift amount calculating section 133 performs the calculation of the shift amount, in the case that two phases are detectable, there is no need to shift, hence the phase shift amounts of each-phase PWM-signals are set to zero. In the case that only one phase is detectable, the phase of a phase having a maximum duty command value or a minimum duty command value is delayed or advanced, and the shift amount thereof is calculated. In the case that no phase is detectable, both the phase of the phase having the maximum duty command value and the phase of the phase having the minimum duty command value are shifted, and the respective shift amounts are calculated.

Next, the current detection term determining section 152 determines the current detection start timing depending on the current detection circuit 150, based on the falling time of each-phase PWM-signals determined by the phase shift amount calculating section 133 (Step S20). The PWM-signal phase shift section 134 performs the phase shift of each-phase PWM-signals only based on the calculated shift amount (Step S21). Moreover, the explanation about the calculation of the shift amount in each of seven periods within two control periods will be described in detail through FIG. 12. In the case that there is no PWM-phase shift (Step S14), the phase shift amount is zero.

Then, when becoming the current detection start timing (Step S22), the current detection circuit 150 starts the A/D conversion (Step S23). The switching of each phase is not carried out during the A/D conversion, and the PWM-signal of the predetermined phase falls at a time point where a time necessary for the A/D conversion has elapsed. After the current detection circuit 150 detects the currents of two phases in such a manner, the each-phase current input section 151 calculates the current value of the remaining one phase that is not detected based on a principle that the total of three currents flowing into the three-phase motor is zero (Step S24).

Next, it is judged whether it is the second control period or not (Step S30). In the case of the first control period, the operation is returned to the above Step S21 and performing of the shift is repeated. Further, if the judgment is the second control period, the current detection observer 141 reads out a previous current detection value (Step S31) and estimates the current value of the present control period (Step S32). The PWM-signal generating section 131 generates each-phase PWM-signals of the present control period based on the current estimation value estimated by the current detection observer 141 (Step S33), further performs the first remaining shift (Step S34), and repeats until becoming the termination of the shift, i.e. a final position (Step S35). When becoming the termination of the shift, if the operation is the third control period, it returns, and in the case that it is not the third control period, it returns to the above Step S30. Thus, the above operations are repeated (Step S36).

Figure 11:
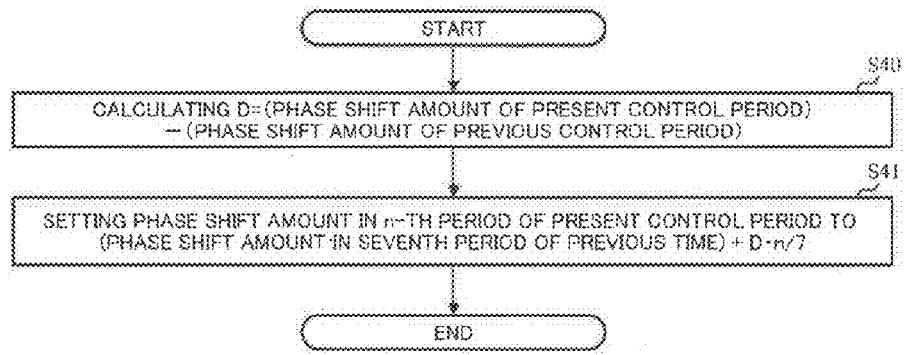
FIG. 11 is a flowchart showing a calculation example of a shift amount.

FIG. 11 is a flowchart about the calculation of the shift amount in each of the seven periods within two control periods, in this control, the control period is 250 µs, and includes seven periods of the PWM-signal based on the carrier signal of saw-tooth waveform of 50 µs period. At first, a difference D between the phase shift amount of the present control period and the phase shift amount of the previous control period is calculated with respect to each phase (Step S40). Next, the phase shift amount in the n-th period of the present control period is set to "(the phase shift amount in seventh period of the previous period)+D·n/7" with respect to each phase (Step S41). That is to say, the phase shift amount in the first period of the present control period is set to "(the phase shift amount in seventh period of previous period)+D/7", the phase shift amount in the second period of the present control period is set to "(the phase shift amount in seventh period of the previous period)+D·2/7", the phase shift amount in the third period of the present control period is set to "(the phase shift amount in seventh period of the previous period)+D·3/7", the phase shift amount in the fourth period of the present control period is set to "(the phase shift amount in seventh period of the previous period)+D·4/7", the phase shift amount in the fifth period of the present control period is set to "(the phase shift amount in seventh period of the previous period)+D·5/7", the phase shift amount in the sixth period of the present control period is set to "(the phase shift amount in seventh period of the previous period)+D·6/7", and the phase shift amount in the last seventh period of the present control period is set to "(the phase shift amount in seventh period of the previous period)+D".

In particular, in the case that the movement amount of the phase of the predetermined phase in the just before control period and the movement amount of the phase of the predetermined phase in the present control period are the same, "D=0" is obtained, and the phase shift amounts in all the periods of the present control period become the same as the phase shift amount in the seventh period of the previous time. That is to say, there is no change in the state of shift in the just before control period and the present control period.

Further, in the case that the movement amount of the phase of the predetermined phase in the just before control period is zero and the movement amount of the phase of the predetermined phase in the present control period is not zero, the phase shift amount in the n-th period of the present control period becomes "D·n/7". In other words, the shift amount is gradually increased from zero in the present control period. Moreover, in the case that the movement amount of the phase of the predetermined phase in the just before control period is not zero and the movement amount of the phase of the predetermined phase in the present control period is zero, since "D=−(the phase shift amount in the seventh period of the previous time)" holds, the phase shift amount in the n-th period of the present control period becomes the following Expression 1.

(phase shift amount in seventh period of previous time)+D·n/7=(phase shift amount in seventh period of previous time)·(1−n/7)　　　[Expression 1]

In other words, the shift amount is gradually decreased in the present control period and the shift amount becomes zero at the last period. That is, the phase moves to the final position.

Figure 12:
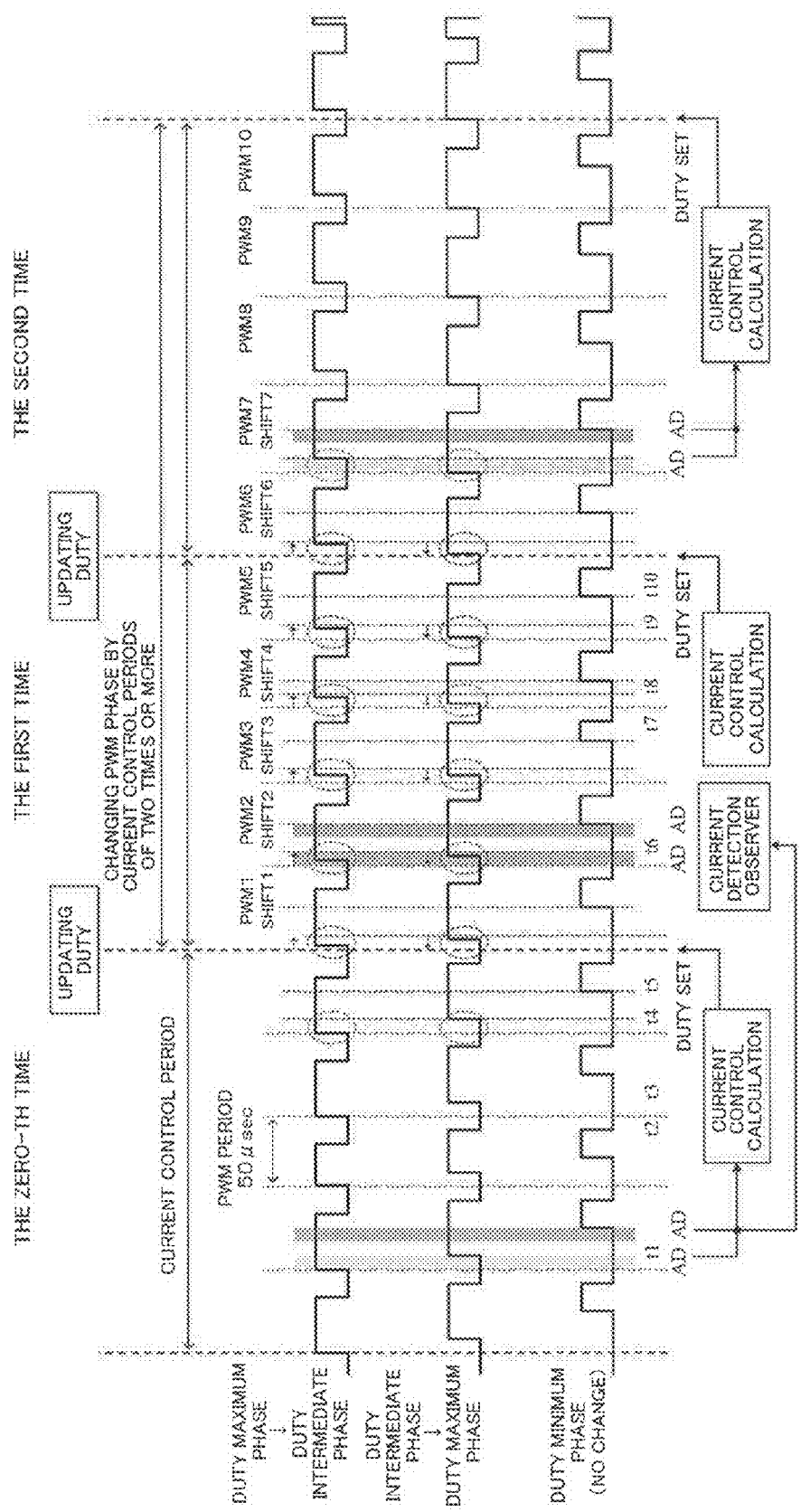
FIG. 12 is a timing chart showing one example of a shift correction of PWM-signals based on the present invention.

FIG. 12 shows each phase timing example of the shift and the control in a case that the maximum phase of the duty command value is shifted to the intermediate phase, the intermediate phase of the duty command value is shifted to the maximum phase and the minimum phase of the duty command value is not shifted.

Each phase current detection (A/D conversion) is performed by the current detection circuit 150 at a timing t1 of the zero-th control period, the current control calculation (the calculation of the current command value) is performed by using the current detection value thereof, and the duty calculation (the pulse width and the presence or absence of the shift) associated with the current control calculation is performed. Timings t2 and t3 correspond to the current control calculation and the duty calculation respectively, a timing t4 shows a case that the shift is necessary, the present invention performs the shift seven times and concurrently the sixth time and the seventh time come to enter the next period (the second time). The duty calculated by using the current detection value is set at a start timing t5 of the first control period, and the shift correction is gradually performed in order of "PWM1 shift1", "PWM2 shift2", "PWM3 shift3", "PWM4 shift4", "PWM5 shift5", "PWM6 shift6" and "PWM7 shift7". As a result, the sixth time (PWM6 shift6) and the seventh time (PWM7 shift7) enter the next period (the second time).

Moreover, in the seventh shift, a shift in consideration of quantization errors is performed.

Since the shift correction is performed in the first control period as described above, it is impossible to detect the current by the current detection circuit 150. Therefore, the current detection observer 141 performs the current estimation at a timing t6 by using the current detection value detected at the timing t1. Then, the current control calculation (the calculation of the current command value) is performed by using the current estimation value estimated by the current detection observer 141, and the duty calculation (the pulse width and the presence or absence of the shift) associated with the current control calculation is performed. Timings t7 and t8 show timings that perform the current control calculation by using the current estimation value and the duty calculation respectively, a timing t9 shows a case that the shift is necessary, the shift is performed to the seventh time and comes to enter the next period (the third time). The duty calculated by using the current estimation value and by means of the current detection observer 141 is set at a start timing t10 of the second control period, in the same way as described above, the shift amount of the phase is determined at seven times.

The shift (the seventh time) terminates at a timing of "PWM7 shift7" of the second control period, and the current detection circuit 150 performs the current at a timing t1'. Hereinafter, operations similar to the above are repeated.

The present invention does not limit a range to perform the shift correction within one period of the control period, performs the shift correction of seven times and makes it possible to enter two control periods of the next period. That is to say, although the shift corrections of a total of seven times are performed by the current control using the current detected by a single type current detection circuit (the one-shunt type current detection circuit) 150 and the duty, the shift correction does not fall within one control period, the shift of the sixth time and the seventh time enter the next control period. At the control period during performing the shift correction, since it is impossible for the current detection circuit 150 to perform the current detection, the current detection observer 141 estimates the current by using the current detection value detected by the current detection circuit 150 in the previous time, and the current control and the duty are set by the current estimation value estimated. The result of setting the current control and the duty by the current estimation value is reflected in PWM8, PWM9 and PWM10 of the next period, and simultaneously performs the correction with respect to "PWM6 shift6" and "PWM7 shift7" in some cases.

Moreover, although the above are descriptions about a three-phase brushless motor, in the same control, it is possible to apply the present invention to another motors with another phases.

EXPLANATION OF REFERENCE NUMERALS 1 steering handle (steering wheel)
10 torque sensor
12 vehicle velocity sensor
13 battery
20 motor
100 control unit
101 current command value calculating section
102 maximum output limiting section
104 current control section
105 PWM control section
105A duty calculating section
105B gate driving section
106 inverter
130 CPU
131 PWM-signal generating section
132 duty calculating section
133 phase shift amount calculating section
134 PWM-signal phase shift section
140 current detection propriety judging section
141 current detection observer
142 carrier signal input section
143 duty output section
144 gate driving section
145 inverter
150 one-shunt type current detection circuit
151 each-phase current input section
152 current detection term determining section

The invention claimed is:
1. A multi-phase motor control apparatus comprising:
a driving section comprising pairs of upper-stage arm switching elements and lower-stage arm switching elements, and driving a multi-phase motor;
a single type current detection circuit detecting current values of said multi-phase motor;
a PWM-signal generating section generating plural first each-phase PWM-signals within two control periods based on said current values detected by said current detecting circuit and a carrier signal;
a phase shift control section shifting a first PWM-signal of a predetermined phase, which is generated in said PWM-signal generating section, by gradually changing a phase shift amount within two control periods, and outputting said shifted first PWM-signal to said driving section; and
a current detection observer estimating a current estimation value of said multi-phase motor based on said current values detected by said current detection circuit;
wherein said PWM-signal generating section generates plural second each-phase PWM-signals within two control periods based on said current estimation value and said carrier signal; and
wherein in a case that a phase shift amount of a predetermined phase in a just before control period is zero and a phase shift amount of a predetermined phase in a present control period is not zero, said phase shift control section gradually increases said phase shift amount from zero in said present control period and a next control period, and uses said second each-phase PWM-signals in said next control period.

2. The multi-phase motor control apparatus according to claim 1, wherein said phase shift control section calculates a phase shift amount to a final shift position of said first PWM-signal, and shifts by "phase shift amount/n" as a shift number is n times.

3. The multi-phase motor control apparatus according to claim 2, wherein with respect to said phase shift of said determined phase, shift times m ($<$n) are performed in said present control period and rest (n-m) times are performed in said next control period.

4. The multi-phase motor control apparatus according to claim 1, wherein said current detection observer estimates a current value in said present control period based on a current value detected in a previous control period.

5. An electric power steering apparatus provided with said multi-phase motor control apparatus according to claim 1.

6. A multi-phase motor control apparatus comprising:
a driving section comprising pairs of upper-stage arm switching elements and lower-stage arm switching elements, and driving a multi-phase motor;
a single type current detection circuit detecting current values of said multi-phase motor;
a PWM-signal generating section generating plural first each-phase PWM-signals within two control periods based on said current values detected by said current detecting circuit and a carrier signal;
a phase shift control section shifting a first PWM-signal of a predetermined phase, which is generated in said PWM-signal generating section, by gradually changing a phase shift amount within two control periods, and outputting said shifted first PWM-signal to said driving section; and
a current detection observer estimating a current estimation value of said multi-phase motor based on said current values detected by said current detection circuit;
wherein said PWM-signal generating section generates plural second each-phase PWM-signals within two control periods based on said current estimation value and said carrier signal; and
wherein in a case that a phase shift amount of a predetermined phase in a just before control period is not zero and a phase shift amount of a predetermined phase in a present control period is zero, said phase shift control section gradually decreases said phase shift amount to zero in said present control period and a next control period, and uses said second each-phase PWM-signals in said next control period.

* * * * *